UNITED STATES PATENT OFFICE.

WILLIAM J. MENZIES, OF ST. HELENS, ENGLAND.

MANUFACTURE OF BICARBONATE OF SODA.

SPECIFICATION forming part of Letters Patent No. 227,032, dated April 27, 1880.

Application filed July 31, 1878.

*To all whom it may concern:*

Be it known that I, WILLIAM JONES MENZIES, of St. Helens, in the county of Lancaster, England, have invented an Improvement in the Manufacture of Bicarbonate of Soda, of which invention the following is a specification.

Hitherto the soda-ash of commerce and other impure carbonates used in the manufacture of bicarbonate of soda required to be dissolved and then crystallized, for the purpose of obtaining a bicarbonate of soda free from iron, sulphate of soda, and other impurities.

The crystals of carbonate soda (sal-soda) thus obtained are then subjected to the action of carbonic acid to drive out the water of crystallization and convert the carbonate into bicarbonate of soda, this being both a tedious and expensive process.

I take the soda-ash or impure carbonate of soda and dissolve it in water, making as nearly a saturated solution as may be convenient. To this solution I force in carbonic acid or add sufficient bicarbonate of soda to completely convert all the caustic soda contained into carbonate of soda. The necessary quantity can easily be ascertained by testing the solution from time to time for caustic alkali with nitrate of silver, in the usual way. I now add a small quantity of bleaching-powder, so as completely to oxidize the solution, and allow it to settle. In this manner all the iron and insoluble impurities are removed. I now draw off the clear solution and force carbonic acid through it in a suitable vessel, by means of a force-pump and coil of perforated pipe, in the usual way; or I use a close vessel and force in carbonic acid under a moderate pressure, when the absorption is much more rapid. In this manner almost the whole of the carbonate of soda can be precipitated as bicarbonate of soda of great purity, leaving the sulphate of soda and chloride of sodium in solution.

The bicarbonate of soda thus produced is removed and washed by percolation with a little pure water and left to drain, in order to remove the last traces of the mother-liquor, the resulting liquor from this part of the process being carried forward to the next operation. It is then dried and ground in the usual manner. In this way I claim that a bicarbonate of soda, of purer quality and at a less cost, can be obtained than by any other process hitherto used.

The mother-liquors from the carbonate can be run into a furnace and boiled down, and used in the manufacture of glass, or for any other purpose, when they become so saturated with sulphate soda and chloride sodium as to be unfit to be used over again.

I claim—

In the manufacture of bicarbonate of soda, the combined process which consists in dissolving the soda-ash of commerce in water, then purifying the solution thus obtained by neutralizing any free soda therein with carbonic acid or bicarbonate of soda, then oxidizing any sulphur compounds in the solution with chloride of lime, and finally precipitating the bicarbonate of soda in the clear solution by carbonic acid, substantially as set forth.

Dated this 17th July, 1878.

W. J. MENZIES.

Witnesses:
    W. HENRY FLETCHER,
        *Notary Public, Liverpool.*
    I. W. THOMPSON,
        *His clerk.*